(12) United States Patent
Acosta

(10) Patent No.: US 6,814,209 B1
(45) Date of Patent: Nov. 9, 2004

(54) INERTIA CLUTCH MECHANISM IN MOTORS TO PREVENT BACKDRIVE

(75) Inventor: Luis E. Acosta, Lawrenceville, GA (US)

(73) Assignee: Siemens VDO Automotive Corporation, Auburn Hills, MI (US)

(*) Notice: Subject to any disclaimer, the term of this patent is extended or adjusted under 35 U.S.C. 154(b) by 0 days.

(21) Appl. No.: 10/616,172

(22) Filed: Jul. 9, 2003

Related U.S. Application Data

(60) Provisional application No. 60/474,291, filed on May 29, 2003.

(51) Int. Cl.[7] .......................... H02K 7/102; E05F 3/16; F16D 59/00
(52) U.S. Cl. .................... 192/223.2; 74/411.5; 74/425; 310/83
(58) Field of Search ............................ 192/223, 223.3, 192/144; 74/425, 411.5; 310/77, 83; 318/15, 273, 372

(56) References Cited

U.S. PATENT DOCUMENTS

| | | | |
|---|---|---|---|
| 1,181,384 A | | 5/1916 | Heaslet |
| 1,517,285 A | | 12/1924 | Fischedick et al. |
| 1,738,308 A | * | 12/1929 | Meunier .................... 74/425 |
| 1,925,161 A | | 9/1933 | Williams |
| 2,006,896 A | | 7/1935 | Joyce |
| 2,173,660 A | | 9/1939 | Perkins |
| 2,317,490 A | | 4/1943 | Simpson |
| 2,557,958 A | * | 6/1951 | Fitzsimmons .............. 192/223 |
| 2,747,426 A | | 5/1956 | Robinson |
| 2,766,851 A | * | 10/1956 | Driehaus ................... 192/218 |
| 2,851,137 A | * | 9/1958 | Gravenstine ............. 192/223.3 |
| 2,958,235 A | | 11/1960 | Hannum |
| 2,984,121 A | | 5/1961 | Folkerts |
| 3,038,346 A | | 6/1962 | MacFarland |
| 3,446,085 A | | 5/1969 | Ginsberg |
| 3,511,920 A | | 5/1970 | Hertfelder |
| 3,549,218 A | | 12/1970 | Cagnon et al. |
| 3,635,100 A | | 1/1972 | Littmann |
| 3,798,990 A | | 3/1974 | Knappe et al. |
| 4,330,713 A | | 5/1982 | Greenwood |
| 4,652,781 A | | 3/1987 | Andrei-Alexandru et al. |
| 4,993,277 A | | 2/1991 | Adam et al. |
| 5,605,071 A | | 2/1997 | Buchanan, Jr. |
| 5,872,412 A | * | 2/1999 | Mita et al. .................... 310/83 |
| 6,051,901 A | | 4/2000 | Ishida |
| 6,491,131 B1 | | 12/2002 | Appleyard |

* cited by examiner

Primary Examiner—Rodney H. Bonck

(57) ABSTRACT

A clutch mechanism 20 is provided for a motor 10. The motor has a shaft 12, a worm 14 associated with the shaft, a gear 16 engaged by the worm, and a friction surface 27. The clutch mechanism 20 includes a pressure plate 22 mounted for movement with respect to the shaft toward and away from the friction surface 27. A spring 26 is constructed and arranged to bias the pressure plate towards the friction surface. A stop 30 is constructed and arranged to limit movement of the pressure plate in a direction away from the friction surface. Whereby, under a back drive condition of the motor when the motor is not energized and the gear is moved by an externally applied torque causing an axial force to be exerted on the worm inducing an axial and an angular movement to the shaft, the pressure plate is constructed and arranged to move towards and engage the friction surface thereby impeding rotation of the shaft.

18 Claims, 5 Drawing Sheets

INERTIA CLUTCH MECHANISM IN MOTORS TO PREVENT BACKDRIVE

This application is based on U.S. Provisional Application No. 60/474,291 filed on May 29, 2003, and claims the benefit thereof for priority purposes.

FIELD OF THE INVENTION

The invention relates to a unidirectional clutch mechanism for electric motors that becomes operational (engages) in one axial and one angular shaft direction.

BACKGROUND OF THE INVENTION

The purpose of this mechanism is to prevent a worm and gear in a motor from being back driven in the event that an external torque is applied at the output end of a gear arrangement. Currently this function is achieved by decreasing the gearing efficiency; however, the negative effect is that the overall system efficiency is decreased as well, possibly requiring a larger motor. By selectively having the ability to lock the system worm and gear, the gearing efficiency can be optimized to a higher level without major concerns for back drive.

Current systems with similar functionality are based on the overrunning clutch drive configuration with an added taper to the shaft, so axial and radial engagements are selectively accomplished. These configurations are comprised of numerous small components that add cost to the system.

Thus, there is a need to provide a clutch mechanism that locks the system worm and gear and has fewer parts than conventional assemblies.

SUMMMARY OF THE INVENTION

An object of the present invention is to fulfill the need referred to above. In accordance with the principles of the present invention, this objective is obtained by providing a clutch mechanism of a motor. The motor has a shaft, a worm associated with the shaft, a gear engaged by the worm, and a friction surface. The clutch mechanism includes a pressure plate mounted for movement with respect to the shaft toward and away from the friction surface. A spring is constructed and arranged to bias the pressure plate towards the friction surface. A stop is constructed and arranged to limit movement of the pressure plate in a direction away from the friction surface. Whereby, under a back drive condition of the motor when the motor is not energized and the gear is moved by an externally applied torque causing an axial force to be exerted on the worm inducing an axial and an angular movement to the shaft, the pressure plate is constructed and arranged to move towards and engage the friction surface thereby impeding rotation of the shaft.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
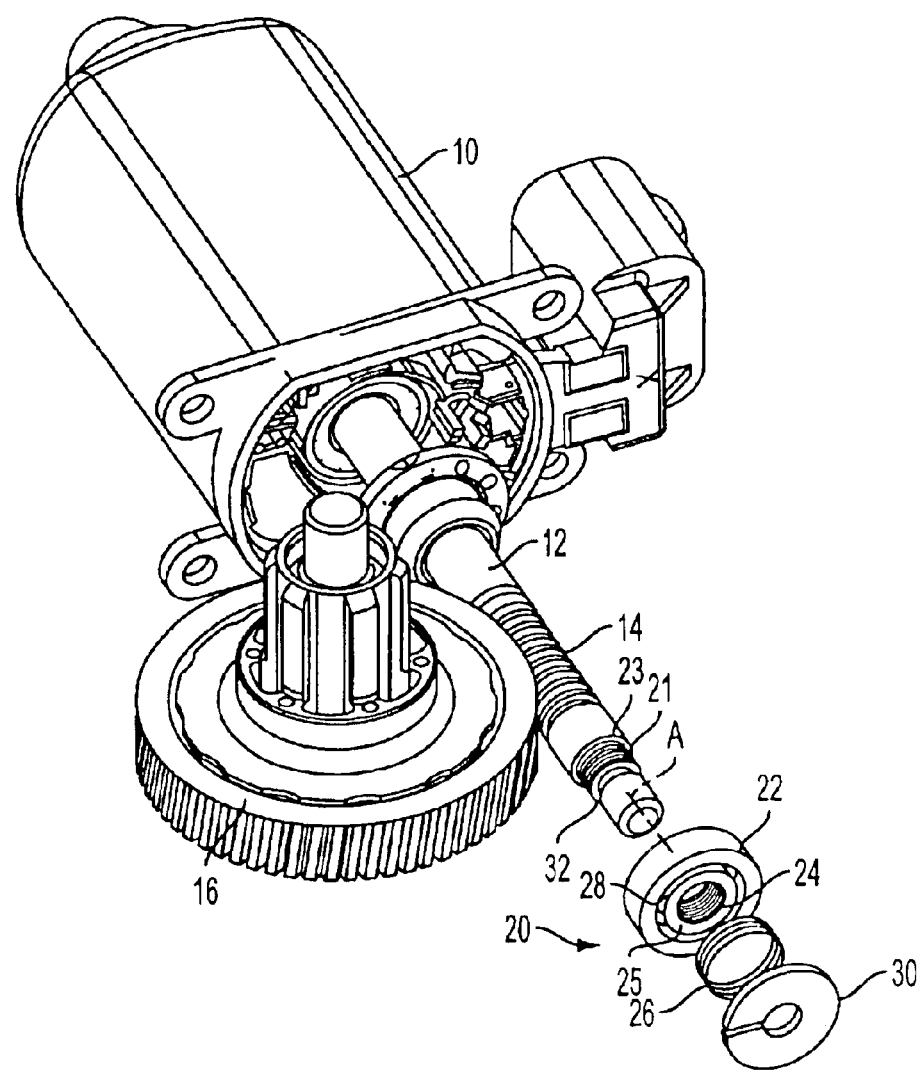
FIG. 1 is a perspective view of an electric motor having an inertia clutch mechanism, shown in exploded view in accordance with the principles of the invention, with a gear housing of the motor not shown for clarity of illustration.

A clutch mechanism, for an electric motor 10, is shown generally indicated at 20 in FIG. 1, in accordance with the principles of the present invention. The motor 10 includes a shaft 12 having a worm 14 that engages an output gear 16.

A single or multiple-start helix 21 is provided on the motor output shaft 12 in addition to the worm 14. The helix 21 is adjacent to a stop or shaft shoulder 23, the function of which will be explained below. The clutch mechanism 20 includes a generally cylindrical pressure plate 22. The pressure plate 22 has a central boss 25 with an opening defining a helical configuration 24 that mates with the helix 21 of the shaft 12, so that the pressure plate 22 is movable along the axis A of the shaft 12. As shown in FIGS. 2–7, the pressure plate 22 is operatively associated with a friction surface 27 that is preferably part of the housing of motor 10.

A single compression spring 26 is disposed about the boss 25 of the pressure plate 22 within a recess 28 and biases the pressure plate 22 toward the friction surface 27. A disk-shaped retainer 30, defining a stop, is fixed to a groove 32 in the shaft 10 and is positioned in such a manner so that the pressure plate 22 will contact the retainer 30 under certain conditions as explained below. The spring 26 also reduces noise due to vibration. The shoulder 23 of the shaft 12 limits movement of the pressure plate 22 in the direction away from the retainer 30, as explained below.

As an alternative to the retainer 30 for limiting movement of the pressure plate 22, retainers that do not require grooves in the shaft can be used. A second retainer 30 and groove 32 could serve the same function as shaft shoulder 23.

When the motor 10 is coupled to a load, multiple vector forces act on the worm 14 in the worm and gear assembly. One of the bi-directonal axial forces coincident with the shaft/worm axis is used as a parameter to determine whether the motor 10 is in back drive condition. Another parameter is one of the two possible directions of shaft rotation. The specific combination of these two directions is unique to and defines a back drive condition while the motor is not energized.

Figure 2:
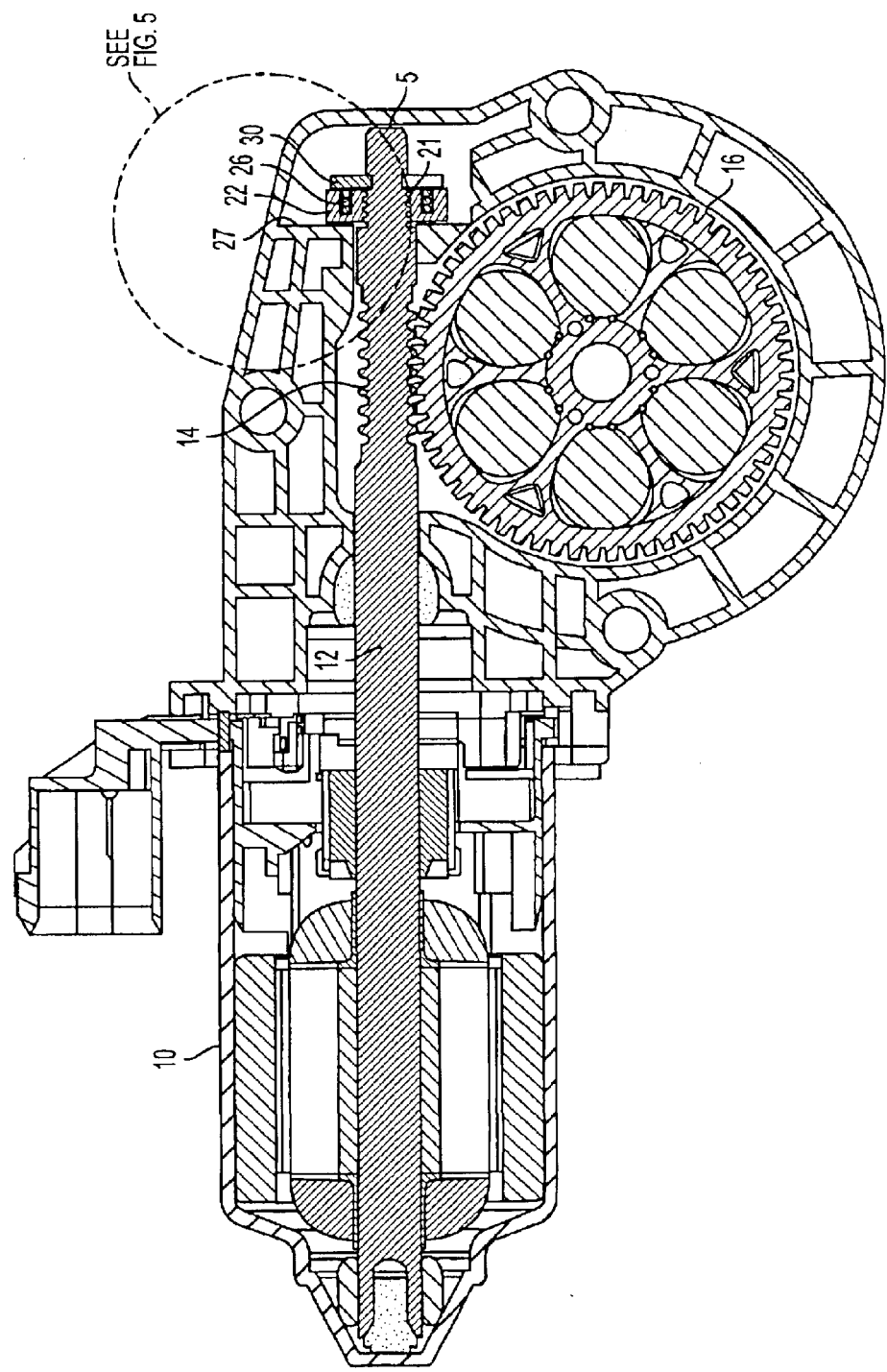
FIG. 2 is sectional view of the electric motor of FIG. 1 having a worm and gear and the clutch mechanism, shown with the motor output gear driven by external torque in a back drive condition (motor not energized).
Figure 3:
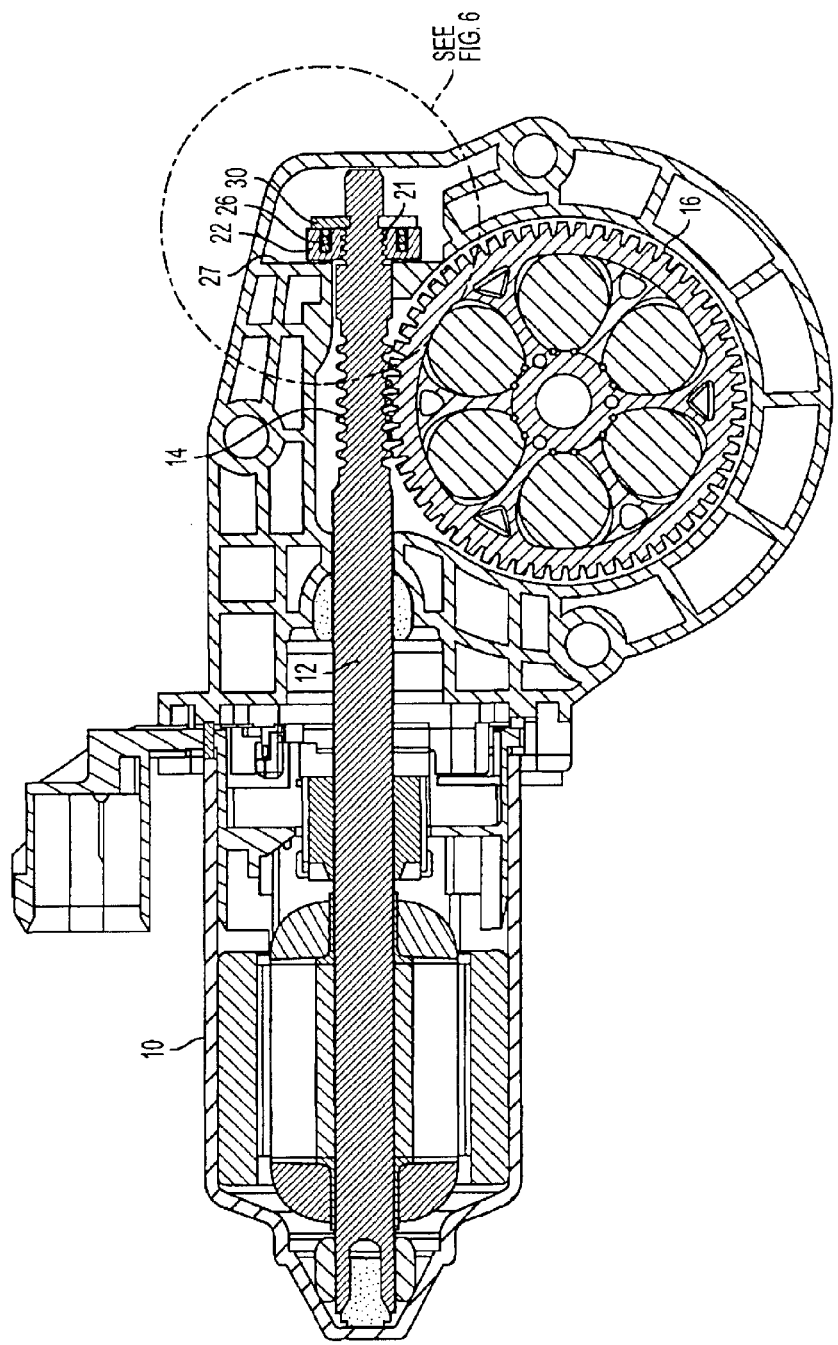
FIG. 3 is sectional view of the electric motor of FIG. 1 having a worm and gear and the clutch mechanism, shown with the motor shaft driving in a clockwise direction (motor energized).
Figure 4:
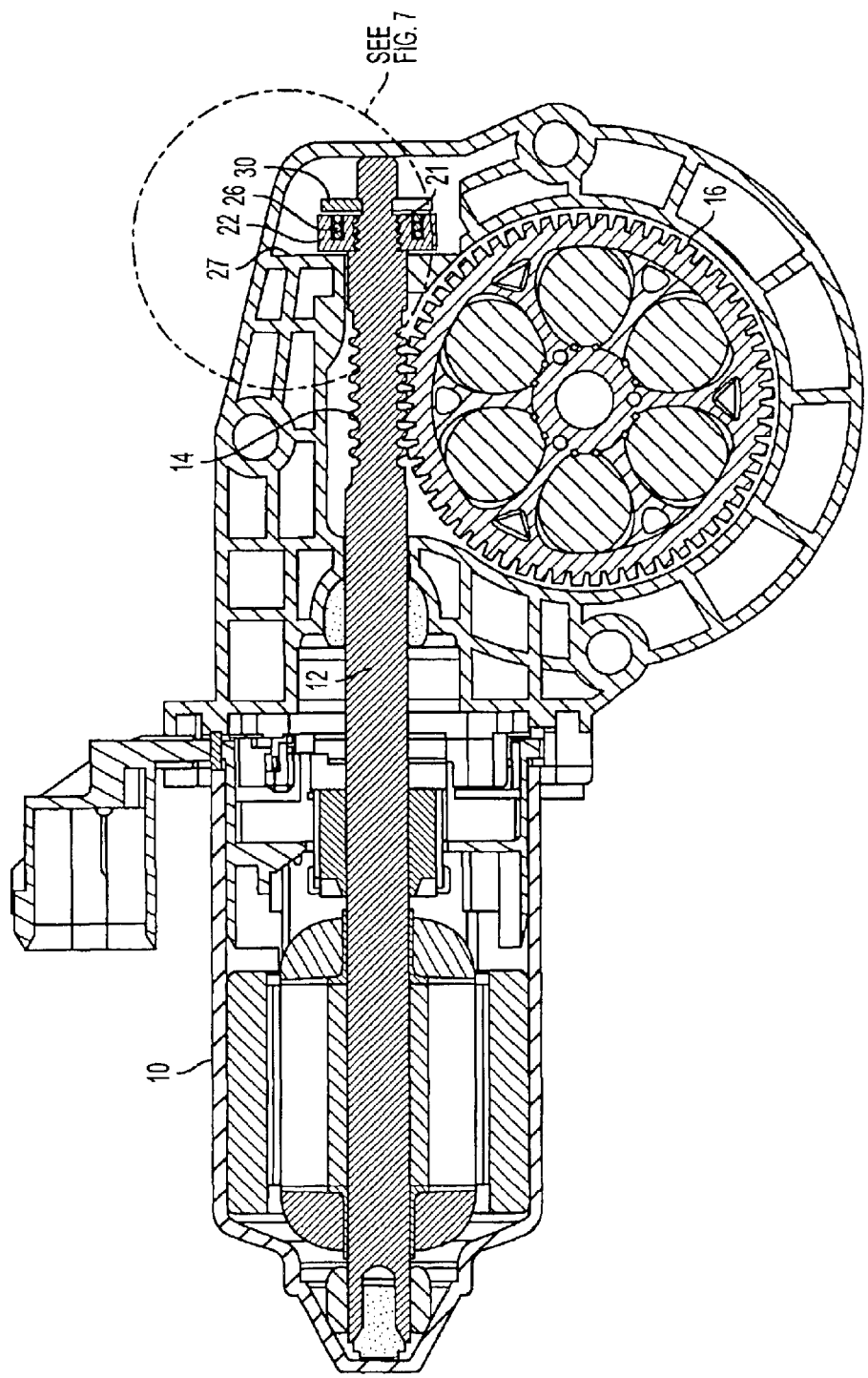
FIG. 4 is sectional view of the electric motor of FIG. 1 having a worm and gear and the clutch mechanism, shown with the motor shaft driving in a counter-clockwise direction (motor energized).
Figure 5:
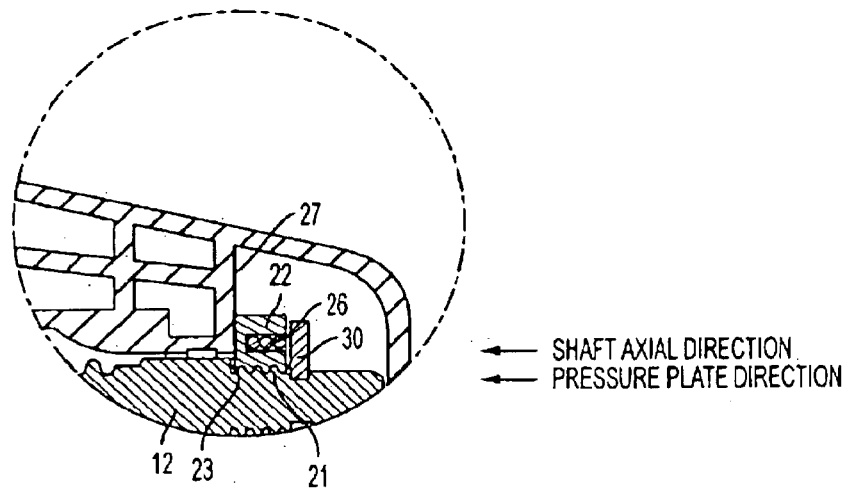
FIG. 5 is an enlarged view of the portion encircled at 5 in FIG. 2.
Figure 6:
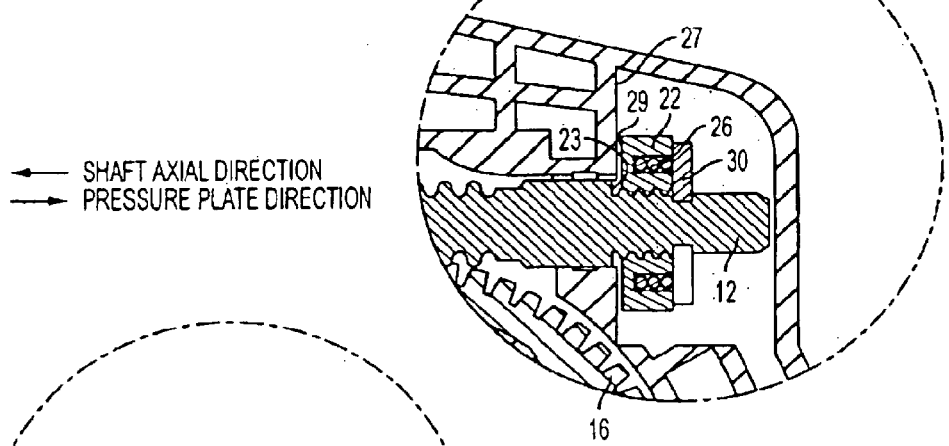
FIG. 6 is an enlarged view of the portion encircled at 6 in FIG. 3.
Figure 7:
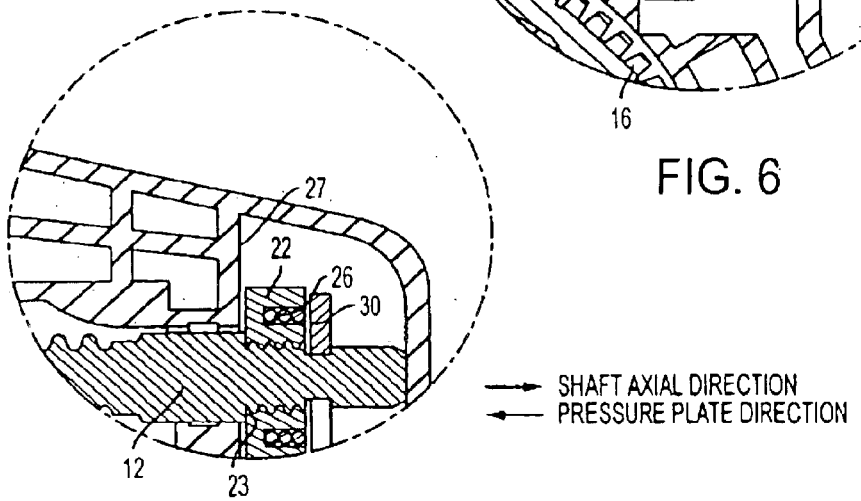
FIG. 7 is an enlarged view of the portion encircled at 7 in FIG. 4.

The operation of the clutch mechanism 20 will be appreciated with reference to FIGS. 2–7. When the motor output gear 16 is "driven" in a reverse direction by an externally applied torque, the output gear 16 will exert a force on the worm 14. This force can be caused by someone pushing the vehicle window down (back drive condition when the motor is not energized). This force induces one axial movement and one angular movement onto the shaft 12. In this particular case, the movement combination is the shaft 12 rotating counter-clockwise and moving axially away from the gear 16 (see FIG. 2 and FIG. 5). This combination of movements is different from the remaining movement combinations. Normal motor operation includes two out of three remaining movement combinations. In this case, the shaft 12 rotates clockwise and moves axially away from the gear 16 (FIGS. 3 and 6) or the shaft 12 moves counter-clockwise and moves axially towards gear 16 (FIGS. 4 and 7).

With reference to FIGS. 2 and 5, when the output gear 16 is driven in the counter-clockwise direction, by an external torque, corresponding to the window down direction, the shaft 12 is displaced from right to left in the FIGs. by the resulting axial force from the output gear 16. When back drive is initiated, the shaft 12 starts to rotate counter-clockwise. The pressure plate 22, already in contact with the friction surface 27, due to the spring 26 pre-load, rides its helix 21 right to left in the FIGs. until it locks against the static friction surface 27 due to an increase in friction. This impedes further rotation of the shaft 12 and thus, terminates any possible back drive condition. Note that there is a gap between the retainer 30 and the pressure plate 22 in this back drive condition.

The clutch mechanism 20 is configured and oriented in such way that the pressure plate 22 comes in contact with a friction surface 27 which is preferably part of the motor body when the above-mentioned linear and angular displacements of the shaft 12 take place, increasing the amount of force needed to continue to rotate the armature shaft and thus, limiting worm and gear back drive.

The pressure plate 22 and/or the friction surface 27 can include friction increasing structure 29 (FIG. 6), such as a surface finish treatment, for example, stipple, serrations, a rough surface, or can include a secondary material such as rubber on their respective contact surfaces. The friction increasing structure 29 increases the coefficient of friction on the surface to which it is applied and thus increases the amount of torque opposing back drive.

In normal operation, when the motor is energized and the shaft/worn becomes the driving element, the pressure plate 22 is kept away from the friction surface 27 by means of either its inertia, or by axially displacing the shaft 12 until one of the surfaces that limit the pressure plate's linear travel impedes the pressure plate's contact with the friction surface 27.

With reference to FIGS. 3 and 6, in a normal "up" mode for moving a window of a vehicle, the motor is energized and the shaft 12 rotates in the clockwise direction becoming the driving element. Due to the pressure plate's 22 own moment of inertia, the pressure plate 22 moves from left to right in the FIGS. 3 and 6, compressing the spring 26 and causing the pressure plate 22 to contact the stop or retainer 30. The shaft 12 displaces from right to left, but there is still enough clearance to prevent the pressure plate from contacting the friction surface 27.

With reference to FIGS. 4 and 7, in a normal "down" mode for moving a window of a vehicle, the motor is energized and the shaft rotates in the counter-clockwise direction becoming the driving element. Due to the pressure plate's 22 own moment of inertia, the pressure plate 22 moves from right to left in the FIGS. 4 and 7, contacting the shaft shoulder 23. The shaft 12 displaces from left to right due to reaction forces, effectively preventing the pressure plate from coming into contact with the friction surface 27, since the shoulder 23 has moved past the extent of the friction surface 27.

The helical configuration 24 defined in the pressure plate 22 and the mating helix 21 of the shaft 12 ensure nearly instantaneous controlled axial movement of the pressure plate once the motor is energized. The axial movement occurs due to the pressure plate's moment of inertia. The pressure plate axial movement direction depends on the shaft direction of rotation, and therefore, on the motor polarity. The helix pitch and number of starts control the pressure plate's axial movement speed and offers some degree of stability for the pressure plate during operation.

The orientation of the clutch mechanism 20 is dependant on the helix orientation of the worm and the gear. In the illustrated embodiment, all directions of displacement and rotation are based on right hand worms (helix) for the gear 16 and pressure plate 22.

In general, the clutch mechanism 20 can be used in any application involving the use of worm gearing coupled to electric motors. The clutch mechanism of the embodiment was configured with automotive windowlift applications in mind.

The desired effect of the use of this clutch mechanism is: 1) to prevent someone from pushing a vehicle door window down without any major impediment, 2) to prevent this same window from displacing downwardly due to vibration during normal vehicle operations, and 3) with the possible gains in efficiency, the electric motor can be configured with a smaller size to be used on the same original application.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A clutch mechanism of a motor, the motor having a shaft including a first stop, a worm associated with the shaft, a gear engaged by the worm, and a friction surface near the stop of the shaft, the clutch mechanism comprising:

a pressure plate mounted for movement with respect to the shaft toward and away from the friction surface, a spring constructed and arranged to bias the pressure plate towards the friction surface, and a second stop constructed and arranged to limit movement of the pressure plate in a direction away from the friction surface, whereby 1) under a back drive condition of the motor when the motor is not energized and the gear is moved by an externally applied torque causing an axial force to be exerted on the worm inducing an axial and an angular movement to the shaft, the pressure plate is constructed and arranged to move towards and engage the friction surface thereby impeding rotation of the shaft, 2) when the motor is driving in a certain direction, the pressure plate is constructed and arranged to move against the bias of the spring and away from engagement with the friction surface and towards the second stop, and 3) when the motor is driving in a direction opposite the certain direction, the pressure plate is constructed and arranged to engage the first stop, preventing the pressure plate from engaging the friction surface, wherein a portion of the shaft includes a helix and the pressure plate includes a helical configuration that mates with the helix of the shaft.

2. The clutch mechanism of claim 1, wherein the pressure plate includes a central boss having an opening defining the helical configuration, the pressure plate including a recess around the central boss.

3. The clutch mechanism of claim 2, wherein the spring is a compression spring disposed about the boss within the recess of the pressure plate.

4. The clutch mechanism of claim 1, wherein the second stop is a disk-shaped retainer fixed to an end of the shaft.

5. The clutch mechanism of claim 4, wherein the end of the shaft includes a groove, the retainer being fixed to the shaft by engagement with surfaces defining the groove.

6. The clutch mechanism of claim 1, wherein the friction surface is part of a housing of the motor.

7. The clutch mechanism of claim 1, wherein the first stop is defined by a shoulder in the shaft.

8. The clutch mechanism of claim 1, wherein one of the pressure plate and the friction surface includes friction increasing structure.

9. The clutch mechanism of claim 8, wherein the friction increasing structure is a surface finish or a secondary material on the pressure plate or friction surface.

10. A clutch mechanism of a motor, the motor having a shaft, a worm associated with the shaft, a gear engaged by the worm, and a friction surface, the clutch mechanism comprising:

a pressure plate mounted for movement with respect to the shaft toward and away from the friction surface, a spring constructed and arranged to bias the pressure plate towards the friction surface, and a stop constructed and arranged to limit movement of the pressure plate in a direction away from the friction surface, whereby under a back drive condition of the motor when the motor is not energized and the gear is moved by an externally applied torque causing an axial force to be exerted on the worm and thus inducing an axial and an angular movement to the shaft, the pressure plate is constructed and arranged to move towards and engage the friction surface thereby impeding rotation of the shaft, wherein a portion of the shaft includes a helix and the pressure plate includes a helical configuration that mates with the helix of the shaft.

11. The clutch mechanism of claim 10, wherein the pressure plate includes a central boss having an opening defining the helical configuration, the pressure plate including a recess around the central boss.

12. The clutch mechanism of claim 11, wherein the spring is a compression, spring disposed about the boss within the recess of the pressure plate.

13. The clutch mechanism of claim 10, wherein the stop is a disk-shaped retainer fixed to an end of the shaft.

14. The clutch mechanism of claim 13, wherein the end of the shaft includes a groove, the retainer being fixed to the shaft by engagement with surfaces defining the groove.

15. The clutch mechanism of claim 10, wherein the friction surface is part of a housing of the motor.

16. The clutch mechanism of claim 10, wherein one of the pressure plate and the friction surface includes friction increasing structure.

17. The clutch mechanism of claim 16, wherein the friction increasing structure is a surface finish or a secondary material on the pressure plate or friction surface.

18. A method of impeding rotation of a shaft under a back drive condition of a motor, the method including the steps of:

providing a motor having a shaft, a worm associated with the shaft, a gear engaged by the worm, and a friction surface, providing a clutch mechanism including a pressure plate mounted for movement with respect to the shaft toward and away from the friction surface; a spring biasing the pressure plate towards the friction surface; and a stop constructed and arranged to limit movement of the pressure plate in a direction away from the friction surface, and under the back drive condition when the motor is not energized and the gear is moved by an externally applied torque causing an axial force to be exerted on the worm and thus inducing an axial and an angular movement to the shaft, permitting the pressure plate to move towards and engage the friction surface thereby impeding rotation of the shaft, wherein the step of permitting the pressure plate to move includes mounting the pressure plate with respect to the shaft using a helix on the shaft and a mating helical configuration on the pressure plate.

* * * * *